Feb. 24, 1970  G. D. SJOSTRAND  3,497,077
GUN RACK FOR VEHICLES

Filed May 29, 1968  2 Sheets-Sheet 1

Gerald D. Sjostrand
INVENTOR.

BY Clarence A. O'Brien
and Harvey B. Jacobson
Attorneys

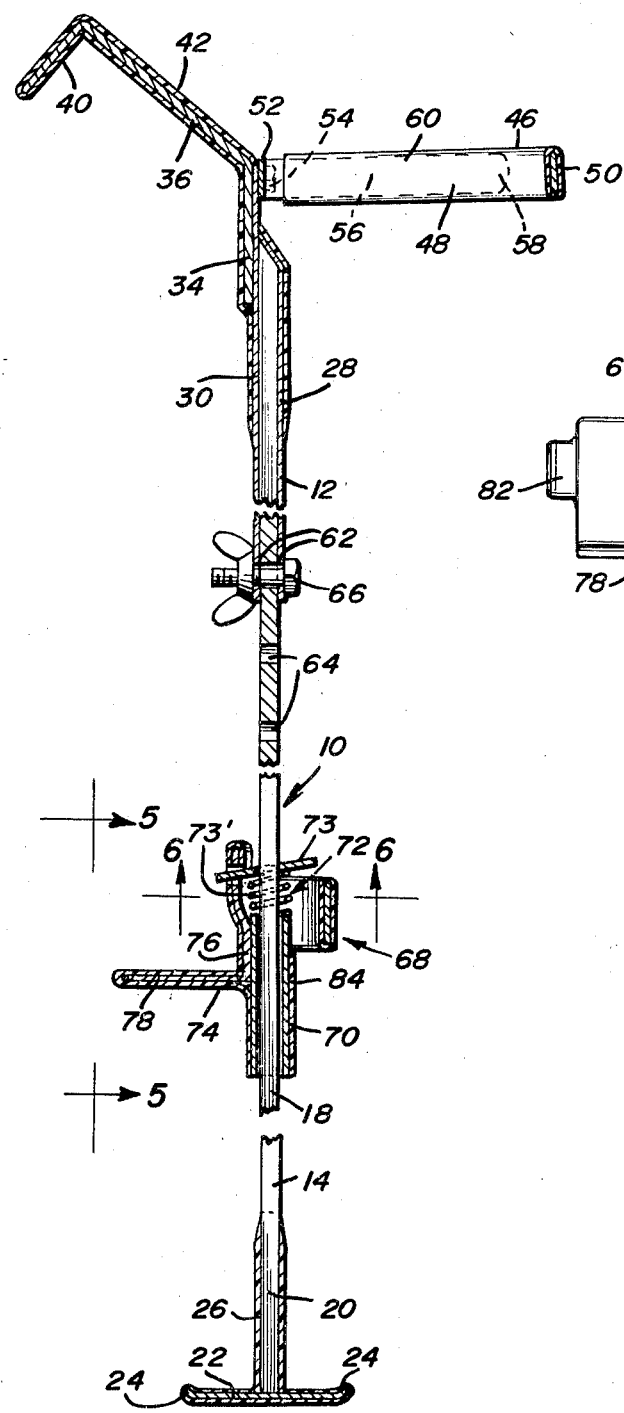

United States Patent Office 3,497,077
Patented Feb. 24, 1970

3,497,077
GUN RACK FOR VEHICLES
Gerald D. Sjostrand, Fresno, Calif., assignor to San Angelo Die Casting and Manufacturing Co., Inc., a corporation of Texas
Filed May 29, 1968, Ser. No. 733,014
Int. Cl. A47f 7/00
U.S. Cl. 211—64
11 Claims

ABSTRACT OF THE DISCLOSURE

An elongated support adapted to be disposed in an inclined position and including means on its upper end adapted to engage and be supported by a passenger vehicle seat back and means disposed intermediate the opposite ends thereof adapted to engage and be supported from the forward edge portion of a vehicle seat cushion. The means at the upper end of the support as well as the means intermediate the opposite ends of the support further include portions adapted to cradle the stock and barrel portions of an inverted and barrel downwardly inclined rifle and the lower end of the support including a transversely extending crosshead including surface portions facing the remote end of the support and adapted to have the muzzle ends of a pair of rifles or shotguns abutted thereagainst.

---

The gun rack of the instant invention is constructed in a manner whereby a pair of shotguns or rifles may be cradled thereby and removably supported therefrom. The gun rack includes means operative to overlie the muzzle ends of guns supported therefrom and means whereby the gun rack may be adjusted so as to conform to the seat portions of various vehicles. In addition, the various portions of the gun rack to be engaged by the guns supported therefrom are covered with a resilient coating and the gun engaging portions of the rack are constructed in a manner whereby they may readily conform to and thus be operable to support substantially all types of shotguns and rifles.

There has long been a need for an apparatus whereby cased or uncased rifles and shotguns may be carried in vehicles in a convenient manner. Also, when sportsmen reach their terminal point of travel by vehicle there is also a need for a means whereby their rifles or shotguns may be supported outside of the vehicle and it is therefore the main object of this invention to provide a gun rack which will be operable to conform to the seat portion of substantially all vehicles, include means whereby a plurality of rifles or shotguns may be supported therefrom and be readily removable from an associated vehicle for positioning alongside the vehicle or in other locations with the associated rifles or shotguns supported therefrom.

Another object of this invention is to provide a gun rack which will be readily adjustable, independent of its adjustment to conform to various vehicle seat portions to conform to rifles and shotguns of different sizes.

Yet another object of this invention is to provide a gun rack including portions thereof adapted to removably engage associated rifles or shotguns and which are covered with a resilient coating whereby to reduce the possibility of damage to the associated rifle or shotgun by the gun rack.

A further object of this invention is to provide a gun rack including substantial portions thereof operative to overlie the muzzle ends of the rifle or shotgun supported from the rack.

A final object of this invention to be specifically enumerated herein is to provide a gun rack in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged fragmentary longitudinal vertical sectional view taken substantially upon the plane indicated by section line 3–3 of FIGURE 2;

FIGURE 4 is a fragmentary enlarged transverse sectional view taken substantially upon the plane indicated by section line 4–4 of FIGURE 1;

FIGURE 5 is a fragmentary plan view taken substantially upon a plane indicated by section line 5–5 of FIGURE 3; and FIGURE 6 is a fragmentary enlarged transverse sectional view taken substantially upon the plane indicated by section line 6–6 of FIGURE 3.

Figure 1:
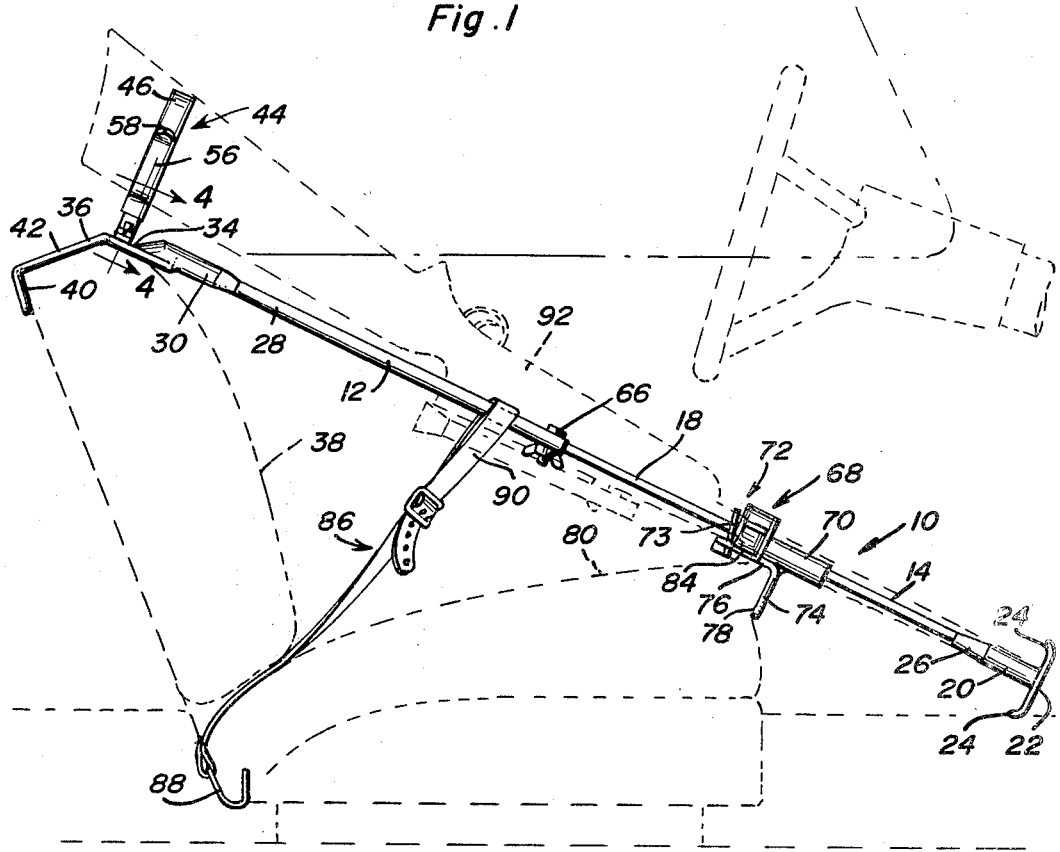
FIGURE 1 is a side elevational view of the gun rack positioned in operative association with vehicle seat portions which are illustrated in phantom lines and with a rifle operatively associated therewith and also illustrated in phantom lines.
Figure 2:
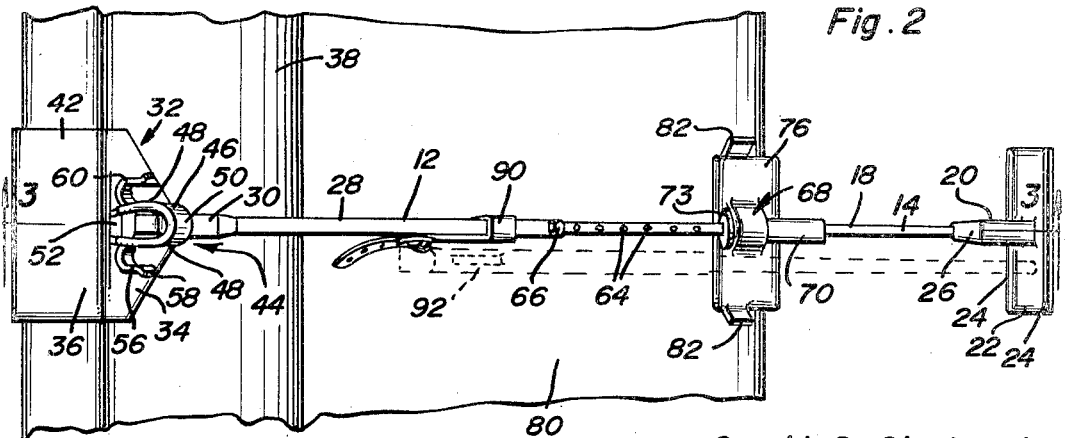
FIGURE 2 is a plan view of the assemblage illustrated in FIGURE 1.

Referring now more specifically to the drawings, the numeral 10 generally designates the gun rack of the instant invention which defines an elongated support including opposite end portions 12 and 14. The end portion 14 includes an elongated tubular member 18 which is square in cross-sectional shape and which has a tubular enlargement 20 secured on its end remote from the end portion 12. The enlargement 20 has a crosshead 22 secured on its end remote from the end portion 12 and the crosshead 22 is in the form of a shallow channel member opening toward the end portion 12 and including opposite side longitudinal flange portions 24 between which the muzzle ends of the associated rifles or shotguns are received on opposite sides of the tubular enlargement 20. In addition, the entire end of the end portion 14 remote from the end portion 12 is dipped into a material such as liquid neoprene to form a resilient coating 26 thereover.

The end portion 12 includes an elongated tubular member 28 which is also square in cross-sectional shape and includes a first end telescoped over the end of the tubular member 18 remote from the crosshead 22. The end of the tubular member 28 remote from the end portion 14 has a tubular enlargement 30 secured thereover and a support plate assembly referred to in general by the reference numeral 32 is secured to the tubular enlargement 30 in any convenient manner such as by welding. The support plate assembly 32 includes a first flange portion 34 disposed in the plane of the tubular member 28 and terminating at its end remote from the end portion 14 in a second flanged portion 36 angulated approximately 45° relative to the flange portion 34 and adapted to overlie the upper marginal edge portion of the vehicle seat back 38. The end of the flange portion 36 remote from the flange portion 34 terminates in a downturned flange portion 40 adapted to project downwardly behind the upper marginal edge portion of the seat back 38 and the entire end of the end portion 12 remote from the end portion 14 is also dipped into liquid neoprene to form a resilient coating 42 thereover.

A gunstock support clamp assembly generally referred to by the reference numeral 44 is provided and includes a generally U-shaped dividing member 46 including a pair of generally parallel legs 48 interconnected at one pair of corresponding ends by a curved bight portion 50 and secured at the other pair of corresponding ends to a mounting plate 52 suitably apertured and secured to the flange portion 34 by means of removable fasteners 54. The U-shaped dividing member 46 is constructed of relatively rigid material and the legs 48 thereof each have one leg portion of a U-shaped member 56 secured thereto in any convenient manner such as by welding. The U-shaped members 56 are constructed of spring metal and the outstanding legs thereof include outturned end portions 58 to have a guiding action on the gunstock being advanced thereinto from the direction in which the U-shaped members 56 open. The gunstock support clamp assembly 44 has all but the mounting plate 52 and the adjacent ends of the legs 46 dipped into liquid neoprene to form a resilient coating 60 thereover and therefore all portions of the support clamp assembly 44 adapted to contact associated gun stocks are covered with a resilient coating 60 to prevent damage to the gunstocks.

The end of the tubular member 28 adjacent the end portion 14 is provided with a pair of aligned apertures 62 and the adjacent end of the end portion 14 includes a plurality of longitudinally spaced bores 64 which are selectively registerable with the apertures 62. A removal fastener 66 is secured through the apertures 62 and a selected bore 64 to secure the gun rack 10 in adjusted extended positions.

A clamp assembly referred to in general by the reference numeral 68 is provided and includes a tubular body portion 70 slidingly disposed on the tubular member 18 provided with a readily releasable clamp structure 72 including a rockable washer 73 encircling the member 18 and spring urged toward a cocked position frictionally engaging the member 18 by means of a compression spring 73' also encircling the member 18 whereby the clamp assembly 68 may be releasably secured in adjusted position along the tubular member 18. The body portion 70 has an L-shaped bracket 74 including a first flange portion 76 and a second flange portion 78 secured thereto in any convenient manner such as by welding with the flange portion 76 generally paralleling the body portion 70 and projecting outwardly from opposite sides of the body portion. The flange portion 78 is disposed at right angles to the body portion 70 and is adapted to extend downwardly in front of the forward marginal edge portion of the seat cushion 80 as illustrated in FIGURE 1 of the drawings. Further, the opposite ends of the flanged portion 76 disposed outwardly of the body portion 70 including upturned tabs 82 for cradling the barrel portion of the associated rifles or shotguns therebetween on opposite sides of the clamp structure 72. Also, all of the stationary portions of the clamp assembly 68 are also dipped into liquid neoprene to form a resilient coating 84 thereover.

In operation, the gun rack 10 may be positioned over the seat construction of the associated vehicle in a manner such as that illustrated in FIGURE 1 of the drawings with the flange portion 40 depending downwardly behind the upper marginal edge portion of the seat back 38 and the clamp assembly 68 slid upwardly along the member 18 and frictionally retained in adjusted position thereon with the depending flange portion 78 firmly clampingly engaged with the front marginal edge portion of the seat cushion 80. Of course, the over-all length of the gun rack 10 may be first adjusted as desired by the telescopic connection between the tubular members 18 and 28 so as to conform to the length of the associated rifle or shotgun. After the rack 10 has been clampingly engaged with the seat back 38 and the seat cushion 80, an adjustable length strap assembly generally referred to by the reference numeral 86 may have the J-shaped hook 88 on one end thereof engaged with the lower rear marginal edge portion of the seat cushion 80 and the adjustable length loop 90 on the other end thereof encircled about the end portion 12 of the rack 10 and adjusted so as to tension the strap assembly 86 whereby the rack 10 will be firmly anchored to the seat back 38 and seat cushion 80. Then, the rifle or shotgun 92 may have its muzzle end abutted against one side of the crosshead 22 with the rifle or shortgun disposed above the gun rack 10. Thereafter, the butt end of the rifle or shotgun may be swung downwardly to embracingly engage the butt of the rifle or shotgun in the corresponding U-shaped member 56.

Inasmuch as the gun rack 10 is removably supported from the seat structure, it may be readily removed from the associated vehicle and disposed alongside the latter with the crosshead 22 resting upon the ground and the upper end of the gun rack 10 leaning against the vehicle or other suitable support.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A gun rack comprising an elongated member including opposite end portions, first and second means carried by said opposite end portions for supportingly engaging the butt and barrel end portions, respectively, of a gun, said elongated member being of a length adapted to span the distance between the upper marginal edge portion of a vehicle seat back and the forward marginal edge portion of the cushion of said seat and including support means for supporting said elongated member from said marginal edge portions, said elongated member including opposite end portions supported from each other for adjustable lengthwise extension relative to each other.

2. A gun rack comprising an elongated member including opposite end portions, first and second means carried by said opposite end portions for supportingly engaging the butt and barrel end portions, respectively, of a gun, said elongated member being of a length adapted to span the distance between the upper marginal edge portion of a vehicle seat back and the forward marginal edge portion of the cushion of said seat and including support means for supporting said elongated member from said marginal edge portions, said second means being supported from said elongated member intermediate its opposite ends and the end of said elongated member remote from said first means including surface means facing said first and second means adapted to have the muzzle end of said gun abutted thereagainst.

3. The combination of claim 2 wherein said elongated member includes opposite end portions supported from each other for adjustable lengthwise extension relative to each other, said first means and said surface means being carried by remote end portions of said opposite end portions.

4. The combination of claim 3 wherein said second means is carried by the end portion of said elongated member from which said surface means is supported.

5. The combination of claim 4 wherein said second means is mounted on the last mentioned end portion of said elongated member for adjustable positioning therealong.

6. The combination of claim 5 wherein said support means includes a bracket carried by the end portion of said elongated member from which said first means is supported, said bracket including a pair of relatively angulated support members, a first of said support members being adapted to overlie the upper marginal portion of said back and the second of said support members being adapted to extend downwardly behind the upper portion of the rear face of said back.

7. The combination of claim 6 wherein said support means includes a flange portion carried by said second means disposed in a plane generally normal to said elongated member and projecting outwardly therefrom for overlying the upper marginal portion of the forward face of said seat cushion.

8. A gun rack comprising an elongated member including opposite end portions, first and second means carried by said opposite end portions for supportingly engaging the butt and barrel end portions, respectively, of a gun, said elongated member being of a length adapted to span the distance between the upper marginal edge portion of a vehicle seat back and the forward marginal edge portion of the cushion of said seat and including support means for supporting said elongated member from said marginal edge portions, said first means including laterally outwardly opening generally U-shaped clip means disposed in a plane generally normal to said elongated member and adapted to embracingly receive a gun butt therein.

9. A gun rack comprising an elongated member including opposite end portions, first and second means carried by said opposite end portions for supportingly engaging the butt and barrel end portions, respectively, of a gun, said elongated member being of a length adapted to span the distance between the upper marginal edge portion of a vehicle seat back and the forward marginal edge portion of the cushion of said seat and including support means for supporting said elongated member from said marginal edge portions, said first and second means being covered with a resilient coating.

10. In combination with a vehicle seat of the type including a seat cushion and an upstanding seat back projecting upwardly from the rear marginal edge portion of the seat cushion, an elongated support member extending between the upper marginal edge portion of said seat back and the forward marginal edge portion of said seat cushion, said support member including first and second abutment portions projecting downwardly therefrom and including opposing abutment surfaces, one of said abutment portions being supported from said support member for adjustable shifting toward and away from the other abutment portion and said abutment portions being positioned relative to said seat and each other with the remote portions of said upper and forward marginal edge portions clampingly engaged between said abutment surfaces, said elongated member including means adapted to removably support an elongated gun therefrom with said gun extending longitudinally thereof.

11. The combination of claim 10 including an adjustable length strap assembly having one end anchored to said support member intermediate said upper and forward marginal edge portions and means on its other end removably anchored to said seat adjacent the adjacent lower and rear marginal edge portions of said seat back and cushion, respectively, said adjustable length strap assembly being disposed under tension.

References Cited

UNITED STATES PATENTS

| | | | |
|---|---|---|---|
| 795,566 | 7/1905 | Wallace | 211—64 |
| 2,692,069 | 10/1954 | Winters et al. | 211—64 |
| 2,721,680 | 10/1955 | Steckman | 211—60 |
| 2,775,351 | 12/1956 | Johnson et al. | 211—64 |
| 2,783,896 | 3/1957 | Agostini et al. | 211—64 |

JAMES A. LEPPINK, Primary Examiner